United States Patent
Takenaka

(10) Patent No.: US 10,578,052 B2
(45) Date of Patent: Mar. 3, 2020

(54) END PLATE FOR VEHICLE

(71) Applicant: TOYOTA JIDOSHA KABUSHIKI KAISHA, Toyota-shi, Aichi-ken (JP)

(72) Inventor: Tetsuhiro Takenaka, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/111,598

(22) Filed: Aug. 24, 2018

(65) Prior Publication Data

US 2019/0063366 A1 Feb. 28, 2019

(30) Foreign Application Priority Data

Aug. 28, 2017 (JP) ................. 2017-163786

(51) Int. Cl.
| | |
|---|---|
| F02F 7/00 | (2006.01) |
| F02B 67/04 | (2006.01) |
| B60K 5/12 | (2006.01) |
| B60K 5/04 | (2006.01) |
| F02B 67/00 | (2006.01) |
| B60K 25/02 | (2006.01) |
| B60K 7/00 | (2006.01) |
| B60K 17/02 | (2006.01) |
| B60K 23/02 | (2006.01) |

(52) U.S. Cl.
CPC ............. *F02F 7/0073* (2013.01); *B60K 5/04* (2013.01); *B60K 5/1216* (2013.01); *B60K 7/00* (2013.01); *B60K 17/02* (2013.01); *B60K 23/02* (2013.01); *B60K 25/02* (2013.01); *F02B 67/00* (2013.01); *F02B 67/04* (2013.01); *F02F 7/0068* (2013.01)

(58) Field of Classification Search
CPC ...... F02F 7/0073; F02F 7/0068; B60K 17/02; B60K 25/02; B60K 7/00; B60K 23/02; B60K 5/04; B60K 5/1216; F02B 67/00; F02B 67/04
See application file for complete search history.

(56) References Cited

U.S. PATENT DOCUMENTS 3,986,413 A * 10/1976 Stockton ............... F16H 47/085
475/54
2014/0274515 A1 9/2014 Takahashi et al.

FOREIGN PATENT DOCUMENTS

| GB | 879219 A | 10/1961 |
|---|---|---|
| JP | S61-155642 U | 9/1986 |
| JP | H01-193069 A | 8/1989 |

(Continued)

OTHER PUBLICATIONS

Aug. 6, 2019 Partial English Translation of Office Action issued in Japanese Patent Application No. 2017-163786.

*Primary Examiner* — Jacob M Amick
*Assistant Examiner* — Charles Brauch
(74) *Attorney, Agent, or Firm* — Oliff PLC

(57) ABSTRACT

An end plate for a vehicle includes an upper end plate, a lower end plate, and a cover that covers a gap between a lower end edge of the upper end plate and an upper end edge of the lower end plate. The vehicle includes an engine and a housing. The engine is fastened to the housing through the end plate. A first stepped portion having a pair of a first flat surface and a second flat surface intersecting with the first flat surface is provided on the engine side of the cover. The first flat surface is inclined downward with respect to a horizontal plane as the first flat surface is directed toward the engine side.

6 Claims, 8 Drawing Sheets

(56) References Cited

FOREIGN PATENT DOCUMENTS

| JP | H10-47222 A | 2/1998 |
|---|---|---|
| JP | 2006-002743 A | 1/2006 |
| JP | 2007-192353 A | 8/2007 |

\* cited by examiner

END PLATE FOR VEHICLE

INCORPORATION BY REFERENCE

The disclosure of Japanese Patent Application No. 2017-163786 filed on Aug. 28, 2017 including the specification, drawings and abstract is incorporated herein by reference in its entirety.

BACKGROUND

1. Technical Field

The disclosure relates to an end plate for a vehicle.

2. Description of Related Art

For example, as shown in Japanese Unexamined Patent Application Publication No. 2006-002743 (JP 2006-002743 A), there is a case where an end plate is interposed between an engine and a housing of a vehicle. There is a case where the end plate is composed of an upper end plate and a lower end plate that are vertically divided, for shared use of parts, improvement in assembling property, or the like, for example.

In an assembly process in a vehicle of the type as described above, a state where an engine block and the housing are fastened to each other in advance through the upper end plate is created. In the state described above, a lower end plate mounting site of the housing is open. In the state described above, work of fastening a flange-shaped rear surface that is present in a shaft end of a crankshaft of the engine and a flywheel of a clutch provided in the housing or a drive plate of a torque converter by using a plurality of fastening bolts is performed through the lower end plate mounting site of the housing. When the work described above is completed, the lower end plate is fastened to the mounting site of the housing.

SUMMARY

Incidentally, in the vehicle of the type as described above, for example, for avoidance of interference with bolts fixing an oil pan to the engine, avoidance of interference between the upper end plate and the lower end plate, or the like when mounting the end plate on the vehicle, a gap is provided between a lower end edge of the upper end plate and a upper end edge of the lower end plate. For this reason, there is a possibility that sand, muddy water, or foreign matter may enter a housing that accommodates a clutch or a torque converter and impair the durability of the clutch or the torque converter in the housing.

The disclosure provides an end plate for a vehicle, in which in a vehicle having a gap between an upper end plate and a lower end plate, it is possible to suitably suppress infiltration of foreign matter into a housing through the gap between the upper end plate and the lower end plate.

An aspect of the disclosure relates to an end plate for a vehicle. The end plate includes an upper end plate, a lower end plate, and a cover that covers a gap between a lower end edge of the upper end plate and an upper end edge of the lower end plate. The vehicle includes an engine and a housing. The engine is fastened to the housing through the end plate. The cover includes a first stepped portion provided on an engine side of the cover. The first stepped portion includes a first flat surface and a second flat surface intersecting with the first flat surface. The first flat surface is inclined downward with respect to a horizontal plane as the first flat surface is directed toward the engine side.

In the end plate according to the aspect of the disclosure, the cover may include an upper end gripping portion, a lower end contact portion, and a connecting portion. The upper end gripping portion may grip the upper end edge of the lower end plate. The lower end contact portion may be in contact with a surface on the housing side of the lower end edge of the upper end plate. The connecting portion may connect the upper end gripping portion and the lower end contact portion. The first stepped portion may be provided on the engine side of the connecting portion.

In the end plate according to the aspect of the disclosure, the cover may be made of elastically deformable synthetic rubber. The cover may integrally include the upper end gripping portion, the lower end contact portion, and the connecting portion.

In the end plate according to the aspect of the disclosure, the upper end edge of the lower end plate may be linear. A central portion in a lateral width direction of the lower end edge of the upper end plate may have a protruding portion that protrudes toward the housing side with respect to the upper end edge of the lower end plate. The gap may be located in an elongated shape between the upper end edge of the lower end plate and the protruding portion. The protruding portion may be located on the housing side above the upper end edge of the lower end plate. The cover may have an elongated shape so as to close the gap.

In the end plate according to the aspect of the disclosure, the cover may include a second stepped portion. The second stepped portion may be located between the upper end edge of the lower end plate and the protruding portion. The second stepped portion may be provided further on the engine side than the first stepped portion is. The second stepped portion may have a third flat surface and a fourth flat surface intersecting with the third flat surface. The third flat surface may have an inclination that is directed downward with respect to a horizontal plane as the third flat surface is directed toward the engine side.

In the end plate according to the aspect of the disclosure, the upper end gripping portion may have a linear groove into which the upper end edge of the lower end plate is fitted. The lower end contact portion may have a cover wall that protrudes upward from the first flat surface and is in contact with the lower end edge of the upper end plate to cover the lower end edge.

In the end plate according to the aspect of the disclosure, the cover may include a front wall on the engine side of the cover. The front wall may have a plurality of cutouts at a plurality of sites in a longitudinal direction of the front wall. The front wall may define the groove. A plurality of engaging projections may be located in the cutouts on a side wall surface on the housing side out of a pair of side wall surfaces facing each other in the groove. A height of the engaging projections may be larger than a width dimension of the groove. A plurality of engaging recesses with which the engaging projections are engaged may be provided at the upper end edge of the lower end plate.

According to the aspect of the disclosure, infiltration of foreign matter into the housing is suppressed by covering the gap between the lower end edge of the upper end plate and the upper end edge of the lower end plate. The first stepped portion having a pair of a first flat surface and a second flat surface intersecting with the first flat surface is provided on the engine side of the cover. The first flat surface is inclined downward with respect to a horizontal plane as the first flat surface is directed toward the engine side. Due to the above, foreign matter infiltrating together with traveling wind from between the engine and the end plate is further restrained from staying on the first flat surface of the first stepped portion and is actively discharged to the outside.

According to the aspect of the disclosure, the cover includes the upper end gripping portion, the lower end contact portion, and the connecting portion. The upper end gripping portion grips the upper end edge of the lower end plate. The lower end contact portion is in contact with the surface on the housing side of the lower end edge of the upper end plate. The connecting portion connects the upper end gripping portion and the lower end contact portion. The first stepped portion is provided on the engine side of the connecting portion. Due to the above, the cover can be easily mounted with respect to the gap between the lower end edge of the upper end plate and the upper end edge of the lower end plate.

According to the aspect of the disclosure, the cover is made of elastically deformable synthetic rubber. The cover integrally includes the upper end gripping portion, the lower end contact portion, and the connecting portion. Due to the above, it is possible to sufficiently seal the gap between the lower end edge of the upper end plate and the upper end edge of the lower end plate, and the cover can be easily mounted with respect to the gap.

According to the aspect of the disclosure, the upper end edge of the lower end plate is linear. The central portion in a lateral width direction of the lower end edge of the upper end plate has the protruding portion that protrudes toward the housing side with respect to the upper end edge of the lower end plate. The gap is located in an elongated shape between the upper end edge of the lower end plate and the protruding portion of the lower end edge of the upper end plate, the protruding portion being located on the housing side above the upper end edge of the lower end plate. The cover has an elongated shape that closes the gap that is located in an elongated shape. Due to the above, interference between the lower end plate and the fastening bolts of the oil pan to the engine block is further avoided.

According to the aspect of the disclosure, the second stepped portion is provided at a portion that is located between the upper end edge of the lower end plate of the cover and the protruding portion of the lower end edge of the upper end plate. The second stepped portion is provided further on the engine side than the first stepped portion is. The second stepped portion has a pair of a third flat surface and a fourth flat surface intersecting with the third flat surface. The third flat surface has an inclination that is directed downward with respect to a horizontal plane as the third flat surface is directed toward the engine side. Due to the above, foreign matter infiltrating together with traveling wind from between the engine and the end plate is further restrained from staying on the third flat surfaces of the second stepped portion and is actively discharged to the outside.

According to the aspect of the disclosure, the upper end gripping portion has the linear groove into which the upper end edge of the lower end plate is fitted. The lower end contact portion has the cover wall that protrudes upward from the first flat surface and is in contact with the lower end edge of the upper end plate to cover the lower end edge. Due to the above, the space between the upper end edge of the lower end plate and the lower end edge of the upper end plate is suitably blocked.

According to the aspect of the disclosure, the cover has a plurality of cutouts at a plurality of sites in the longitudinal direction of the front wall on the engine side, the front wall defining the groove. The engaging projections that are located in the cutouts are provided to project at a height larger than the width dimension of the groove on the side wall surface on the housing side out of the side wall surfaces facing each other in the groove. The engaging recesses with which the engaging projections are engaged are provided in the upper end edge of the lower end plate. Due to the above, when the cover has been mounted on the upper end edge of the lower end plate, the cover is prevented from coming out from the lower end plate due to the engagement of the engaging projections of the cover with the engaging recesses of the lower end plate, and therefore, assembly of the lower end plate to the housing is facilitated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, examples of the disclosure will be described in detail with reference to the drawings. In the following examples, the drawings are appropriately simplified or modified, and the dimensional ratios, shapes, and the like of the respective parts are not always drawn accurately.

Example 1

Figure 1:
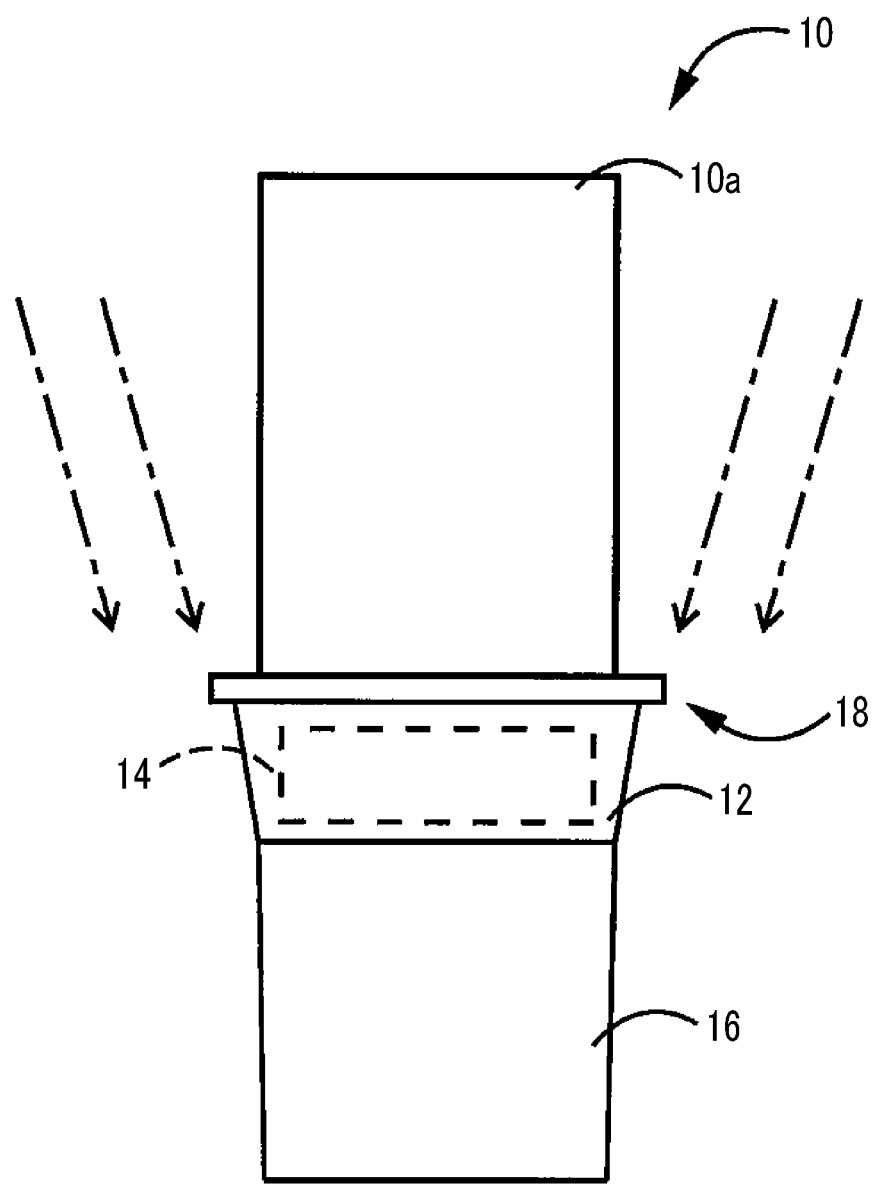
FIG. 1 is a schematic diagram showing an FR vehicle to which a cover of an end plate for a vehicle of Example 1 of the disclosure is applied.

In FIG. 1, a vehicle is provided with an engine 10, a housing 12 that accommodates a clutch 14 that connects and disconnects the power from the engine 10, a transmission case 16 that accommodates a transmission that shifts the power transmitted through the clutch 14 and transmits the power to the rear wheels, and an end plate 18 of the engine 10, the end plate 18 being provided between the engine 10 and the housing 12. In Example 1, the clutch 14 that is accommodated in the housing 12 is a wet type single plate type, and the transmission that is accommodated in the transmission case 16 is a parallel shaft type constant meshing type manual transmission. However, for example, a configuration may be adopted in which a torque converter is accommodated in the housing 12 and an automatic transmission is accommodated in the transmission case 16.

Figure 2:
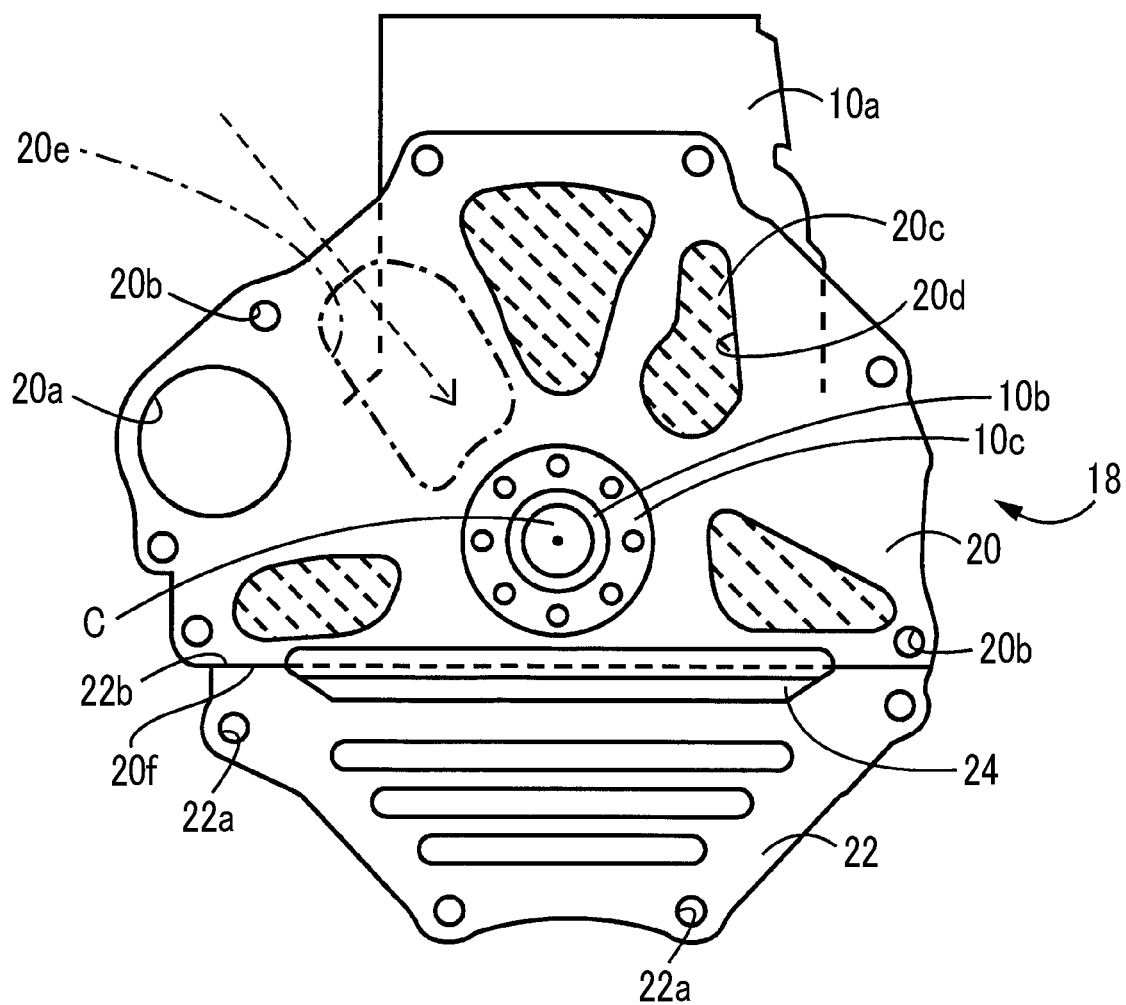
FIG. 2 is a view showing the end plate for a vehicle by removing a housing, in the vehicle of FIG. 1.

In FIG. 2, a shaft end of a crankshaft 10*b* of the engine 10, which rotates around a rotation axis C, penetrates the end plate 18. A flange-shaped end surface 10*c* for fastening a flywheel 14*a* of the clutch 14 is provided at the shaft end of the crankshaft 10*b*.

As shown in FIG. 2, the end plate 18 has a width dimension larger than that of an engine block 10*a* and is formed so as to protrude downward from the engine block 10*a*. The end plate 18 is divided into an upper end plate 20 and a lower end plate 22 by a horizontal parting line that is located below the end face 10*c*. The upper end plate 20 is fastened to the engine block 10*a*. The upper end plate 20 is provided with a motor mounting hole 20*a*, a plurality of mounting holes 20*b*, a plurality of through-holes 20*d*, and a recess 20*e*. The motor mounting hole 20*a* is formed to penetrate the upper end plate 20 such that a starter motor is mounted therein. Fastening bolts are respectively mounted to the mounting holes 20*b*. Each of the through-holes 20*d* is closed by a urethane cover 20*c*. The recess 20*e* is formed on the engine block 10*a* side in order to pass a wire harness therethrough. In a state where the upper end plate 20 is fastened to the engine block 10*a*, a part of the recess 20*e* is located outside the mating surface of the engine block 10*a* and exposed to the outside, and therefore, there is a possibility that foreign matter may infiltrate through the recess 20*e* along a path shown by a broken arrow.

Figure 4:
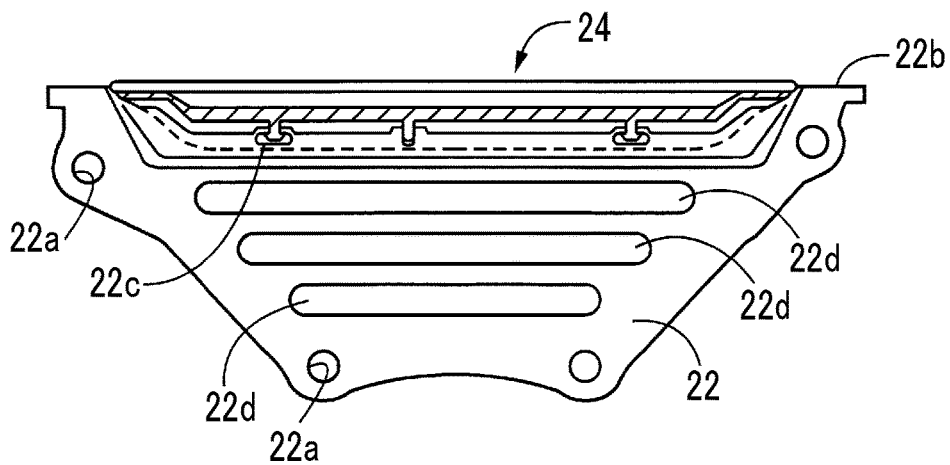
FIG. 4 is a cross-sectional view taken along line IV-IV of FIG. 6 as viewed from the engine side, showing a lower end plate in FIG. 2 together with the cover which is mounted on the lower end plate, in an enlarged manner.

As shown in FIG. 4 as well, the lower end plate 22 is provided with a plurality of mounting holes 22*a*, engaging recesses 22*c*, and three reinforcing ribs 22*d*. Fastening bolts for fastening the lower end plate 22 to the housing 12 are respectively mounted to the mounting holes 22*a*. The engaging recesses 22*c* are provided by cutouts at a plurality of locations of an upper end edge 22*b* in order to mount a cover 24. The three reinforcing ribs 22*d* are formed parallel to the upper end edge 22*b* and below the upper end edge 22*b*. In FIG. 4, the cross section of the cover 24 is shown.

Figure 3:
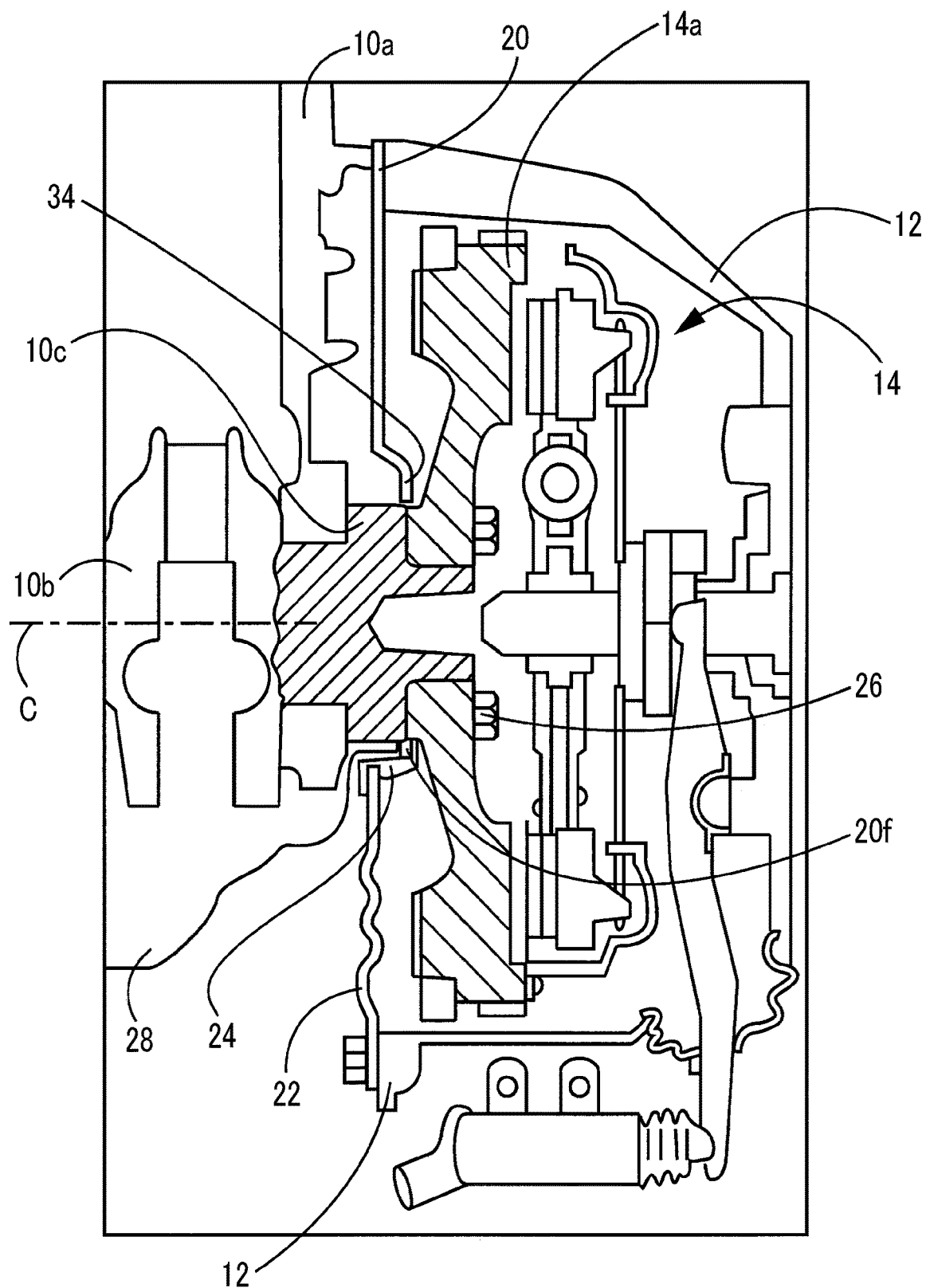
FIG. 3 is a view showing a longitudinal cross section of an engine and the housing in the vehicle of FIG. 1.

In FIG. 3, the flywheel 14*a* of the clutch 14 is fastened to the end face 10*c* provided at the shaft end of the crankshaft 10*b* of the engine 10 by fastening bolts 26. For example, in order to further avoid interference with a bracket 30 or a fastening bolt 32 for fixing an oil pan 28 (described later) to the engine block 10*a*, a protruding portion 34 having a protrusion shape locally protruding toward the clutch 14 side with respect to the upper end edge 22*b* of the lower end plate 22 fastened to the housing 12 is formed at a central portion in a width direction of a lower end edge 20*f* of the upper end plate 20 fastened to the engine block 10*a*. A portion corresponding to the local protrusion shape, of the upper end edge 22*b* of the lower end plate 22, is locally cut out so as to be recessed downward. For this reason, an elongated gap 36, in which a width in an up-and-down direction is relatively large as it goes toward the central portion in the width direction and a width in the direction of the rotation axis C is relatively large as it goes toward the central portion in the width direction, is formed between the central portions in the width direction of the lower end edge 20*f* and the upper end edge 22*b*. The cover 24 is mounted on the lower end edge 20*f* of the upper end plate 20 and the upper end edge 22*b* of the lower end plate 22 such that the cover 24 covers the gap 36, that is, blocks the gap 36.

Figure 5:
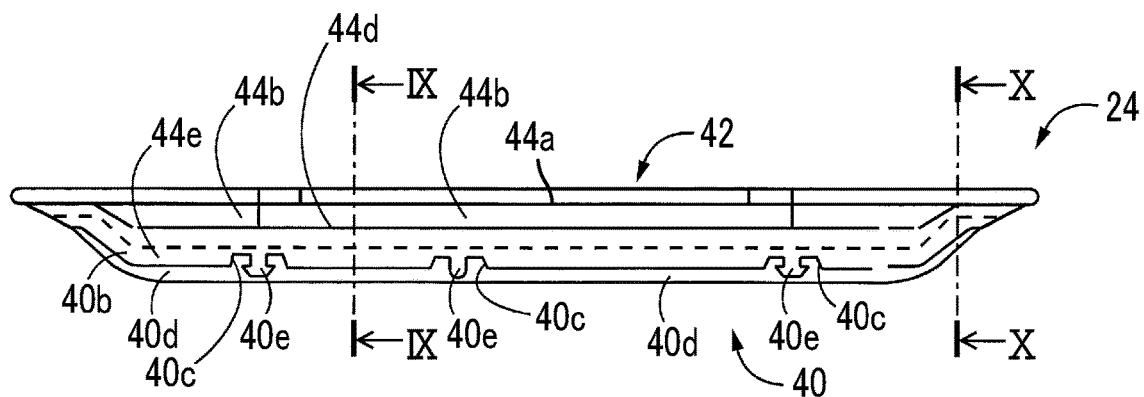
FIG. 5 is a front view of the cover of FIG. 4 as viewed from the engine side.
Figure 6:
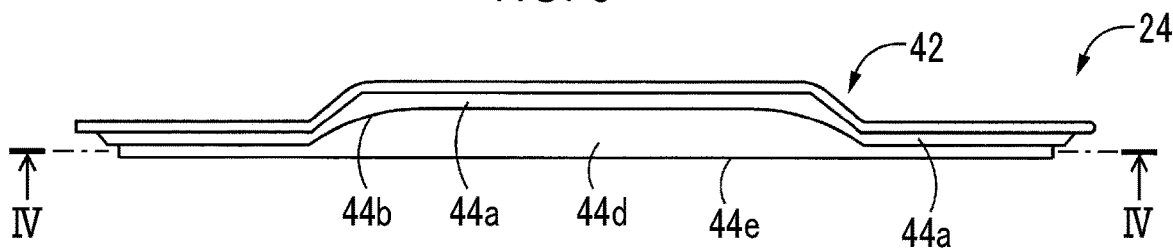
FIG. 6 is a plan view of the cover of FIG. 4.
Figure 7:
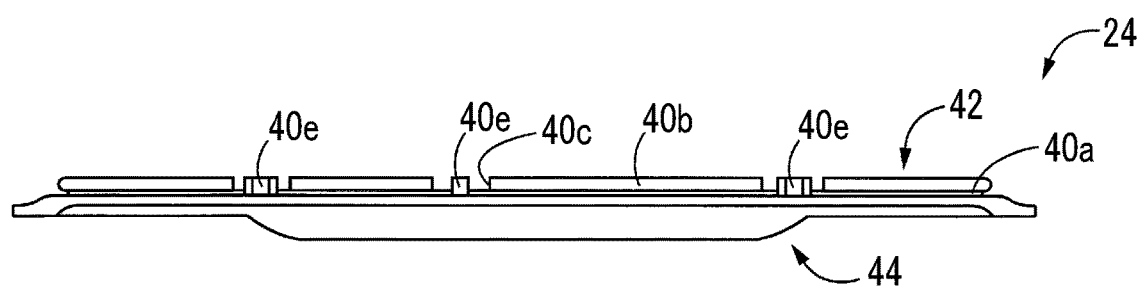
FIG. 7 is a bottom view of the cover of FIG. 4.
Figure 8:
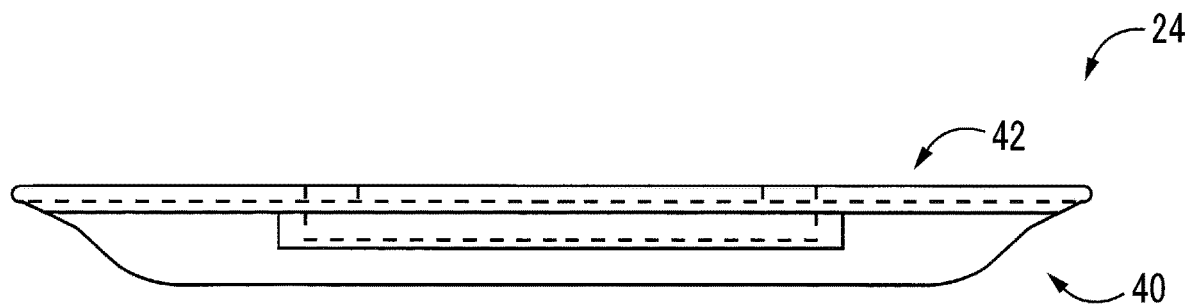
FIG. 8 is a rear view of the cover of FIG. 4.
Figure 9:
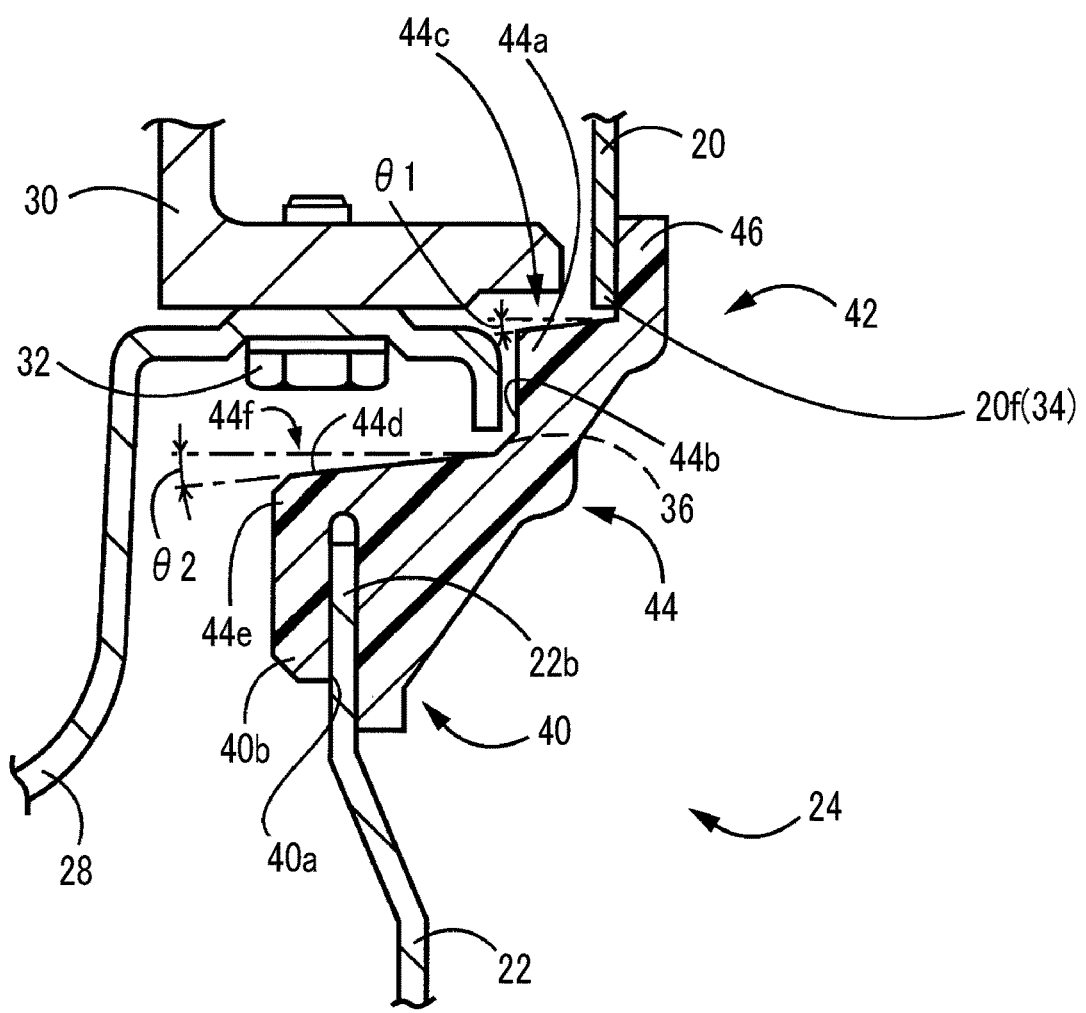
FIG. 9 is a cross-sectional view taken along line IX-IX of FIG. 5, showing the mounted state of the cover of FIG. 4.
Figure 10:
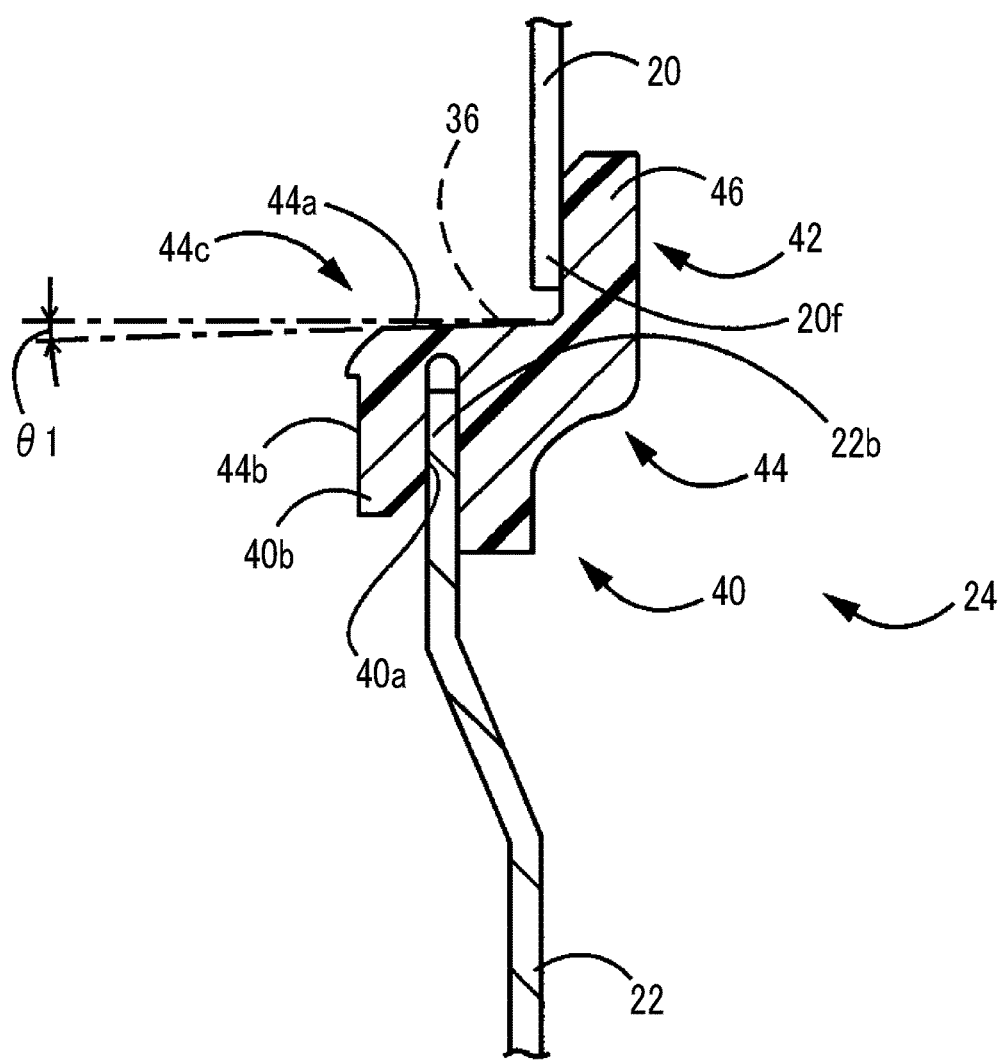
FIG. 10 is a cross-sectional view taken along line X-X of FIG. 5, showing the mounted state of the cover of FIG. 4.

FIG. 5 is a front view of the cover 24 in FIG. 4 as viewed from the engine 10 side. FIG. 6 is a plan view showing the cover 24 in FIG. 4. FIG. 7 is a bottom view showing the cover 24 in FIG. 4. FIG. 8 is a rear view showing the cover 24 in FIG. 4. FIG. 9 is a cross-sectional view of the cover 24 in FIG. 4 and is a cross-sectional view taken along line IX-IX of FIG. 5. FIG. 10 is a cross-sectional view of the cover 24 in FIG. 4 and is a cross-sectional view taken along line X-X of FIG. 5. In FIG. 5 to FIG. 10, the cover 24 is an elastically deformable elongated elastic body formed by die forming of synthetic rubber such as ethylene propylene diene rubber (EPDM), for example.

The cover 24 integrally includes an upper end gripping portion 40, a lower end contact portion 42, and a connecting portion 44. The upper end gripping portion 40 elastically grips the upper end edge 22*b* of the lower end plate 22. The lower end contact portion 42 is in contact with the surface on the housing 12 side of the lower end edge 20*f* of the upper end plate 20. The connecting portion 44 connects the upper end gripping portion 40 and the lower end contact portion 42.

The upper end gripping portion 40 is provided with an elongated groove 40*a* into which the upper end edge 22*b* of the lower end plate 22 is fitted, a plurality of cutouts 40*c*, and a plurality of engaging projections 40*e*. The cutouts 40*c* are formed at a plurality of sites in a longitudinal direction of a front wall 40*b* on the engine 10 side, the front wall 40*b* defining the groove 40*a*. The engaging projections 40*e* are provided to project at a height larger than the width dimension of the groove 40*a* on a side wall surface 40*d* on the housing 12 side out of a pair of side wall surfaces in the groove 40*a*, and are located in the cutouts 40*c*.

The lower end contact portion 42 is provided with a cover wall 46 that projects upward from an end edge on the clutch 14 side of the connecting portion 44, that is, a first flat surface 44*a* (described later), so as to be continuous in the entirety in the longitudinal direction of the cover 24, that is, the width direction of the cover 24 and is in contact with the lower end edge 20*f* of the upper end plate 20 to cover the lower end edge 20*f*.

As described above, the gap 36 is an elongated space between the central portions in the width direction of the lower end edge 20*f* and the upper end edge 22*b*, in which a width in the up-and-down direction is relatively large as it goes toward the central portions in the width direction of the lower end edge 20*f* and the upper end edge 22*b* and a width in the direction of the rotation axis C is relatively large as it goes toward the central portions in the width direction. Therefore, the upper end gripping portion 40 is provided along the central portion in the width direction of the lower end edge 20*f* and the lower end contact portion 42 is provided along the central portion in the width direction of the upper end gripping portion 40. For this reason, the connecting portion 44 connecting the upper end gripping portion 40 and the lower end contact portion 42 to each other has a first stepped portion 44*c* and a second stepped portion 44*f* on the engine 10 side. The first stepped portion 44*c* is configured of a pair of a first flat surface 44*a* and a second flat surface 44*b* intersecting substantially perpendicularly with the first flat surfaces 44*a* formed substantially at the entirety of the central portion in the width direction. The second stepped portion 44*f* is configured of a pair of a third flat surface 44d and a fourth flat surface 44e intersecting substantially perpendicularly with the third flat surface 44d formed at both end portions in the central portion in the width direction. In the mounted state of the cover 24, the first flat surfaces 44a and the third flat surfaces 44d become substantially horizontal surfaces and the second flat surface 44b and the fourth flat surface 44e become substantially vertical surfaces.

As shown in FIG. 9 and FIG. 10, the first flat surface 44a of the first stepped portion 44c formed on the engine 10 side of the cover 24 has an inclination angle θ1 that is directed downward with respect to a horizontal plane as the first flat surface 44a is directed toward the engine 10 side. It is desirable that the inclination angle θ1 is as large as possible within the allowable space. However, suitably, the inclination angle θ1 is determined within an angular range of several degrees to ten and several degrees.

As shown in FIG. 9 and FIG. 10, the third flat surface 44d of the second stepped portion 44f formed on the engine 10 side of the cover 24 also has an inclination angle θ2 that is directed downward with respect to a horizontal plane as the third flat surface 44d is directed toward the engine 10 side. It is desirable that the inclination angle θ2 is also as large as possible within the allowable space. However, suitably, the inclination angle θ2 is determined within an angular range of several degrees to ten and several degrees.

Due to the above, foreign matter infiltrating together with traveling wind along arrows shown by the broken lines in FIG. 2 from between the engine block 10a and the upper end plate 20 is further restrained from staying on the first flat surface 44a of the first stepped portion 44c and the third flat surface 44d of the second stepped portion 44f due to the inclination angle θ1 and the inclination angle θ2 and is actively discharged to the outside.

As described above, the cover 24 of the end plate 18 for a vehicle of Example 1 covers the gap 36 between the lower end edge 20f of the upper end plate 20 and the upper end edge 22b of the lower end plate 22, whereby infiltration of foreign matter into the housing 12 is prevented. The first stepped portion 44c having the first flat surface 44a and the second flat surface 44b intersecting with the first flat surface 44a is provided on the engine 10 side of the cover 24. The first flat surface 44a has the inclination angle θ1 that is directed downward with respect to a horizontal plane as the first flat surface 44a is directed toward the engine 10 side. Due to the above, foreign matter infiltrating together with traveling wind from between the engine 10 and the end plate 18 is further restrained from staying on the first flat surface 44a of the first stepped portion 44c and is actively discharged to the outside.

The cover 24 of the end plate 18 for a vehicle of Example 1 includes the upper end gripping portion 40, the lower end contact portion 42, and the connecting portion 44. The upper end gripping portion 40 grips the upper end edge 22b of the lower end plate 22. The lower end contact portion 42 is in contact with the surface on the housing 12 side of the lower end edge 20f of the upper end plate 20. The connecting portion 44 connects the upper end gripping portion 40 and the lower end contact portion 42. The first stepped portion 44c is provided on the engine 10 side of the connecting portion 44. Due to the above, the cover 24 can be easily mounted with respect to the gap 36 between the lower end edge 20f of the upper end plate 20 and the upper end edge 22b of the lower end plate 22.

According to the cover 24 of the end plate 18 for a vehicle of Example 1, the cover 24 is made of elastically deformable synthetic rubber. The cover 24 integrally includes the upper end gripping portion 40, the lower end contact portion 42, and the connecting portion 44. Due to the above, it is possible to sufficiently seal the gap 36 between the lower end edge 20f of the upper end plate 20 and the upper end edge 22b of the lower end plate 22, and the cover 24 can be easily mounted with respect to the gap 36.

According to the cover 24 of the end plate 18 for a vehicle of Example 1, the upper end edge 22b of the lower end plate 22 is linear. The central portion in the lateral width direction of the lower end edge 20f of the upper end plate 20 has the protruding portion 34 that protrudes toward the housing 12 side with respect to the upper end edge 22b of the lower end plate 22. The gap 36 is located in an elongated shape between the upper end edge 22b of the lower end plate 22 and the protruding portion 34 of the lower end edge 20f of the upper end plate 20, the protruding portion 34 being located on the housing 12 side above the upper end edge 22b of the lower end plate 22. The cover 24 has an elongated shape that closes the gap 36 that is located in an elongated shape. Due to the above, interference between the lower end plate 22 and the fastening bolts 32 of the oil pan 28 to the engine block 10a is further avoided.

According to the cover 24 of the end plate 18 for a vehicle of Example 1, the second stepped portion 44f is provided at a portion of the cover 24, the portion being located between the upper end edge 22b of the lower end plate 22 and the protruding portion 34 of the lower end edge 20f of the upper end plate 20. The second stepped portion 44f is provided further on the engine 10 side than the first stepped portion 44c is. The second stepped portion 44f has the third flat surface 44d and the fourth flat surface 44e intersecting with the third flat surface 44d. The third flat surface 44d has the inclination angle θ2 that is directed downward with respect to a horizontal plane as the third flat surface 44d is directed toward the engine 10 side. Due to the above, foreign matter infiltrating together with traveling wind from between the engine 10 and the end plate 18 is further restrained from staying on the third flat surface 44d of the second stepped portion 44f and is actively discharged to the outside.

According to the cover 24 of the end plate 18 for a vehicle of Example 1, the upper end gripping portion 40 has the linear groove 40a into which the upper end edge 22b of the lower end plate 22 is fitted. The lower end contact portion 42 has the cover wall 46 that protrudes upward from the first flat surface 44a and is in contact with the lower end edge 20f of the upper end plate 20 to cover the lower end edge 20f. Due to the above, the space between the upper end edge 22b of the lower end plate 22 and the lower end edge 20f of the upper end plate 20 is suitably blocked.

According to the cover 24 of the end plate 18 for a vehicle of Example 1, the cover 24 has the cutouts 40c at a plurality of sites in the longitudinal direction of the front wall 40b on the engine 10 side, the front wall 40b defining the groove 40a. The engaging projections 40e that are located in the cutouts 40c are provided to project at a height larger than the width dimension of the groove 40a on the side wall surface on the housing 12 side out of the side wall surfaces facing each other in the groove. The engaging recesses 22c with which the engaging projections 40e are engaged are provided in the upper end edge 22b of the lower end plate 22. Due to the above, when the cover 24 has been mounted on the upper end edge 22b of the lower end plate 22, the cover 24 is prevented from coming out from the lower end plate 22 due to the engagement of the engaging projections 40e of the cover 24 with the engaging recesses 22c of the lower end plate 22, and therefore, assembly of the lower end plate 22 to the housing 12 is facilitated.

Hereinafter, other examples of the disclosure will be described. In the following description, parts shared by the above-described example are denoted by the same reference numerals and the description thereof is omitted.

Example 2

Figure 11:
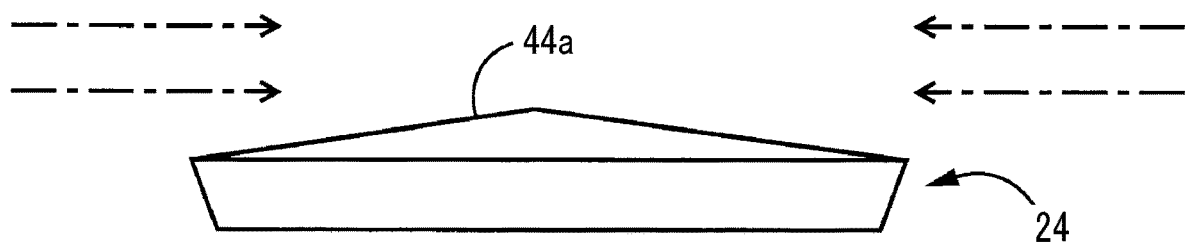
FIG. 11 is a schematic diagram showing the shape of a cover of Example 2 of the disclosure, which is applied to the vehicle of FIG. 1.

FIG. 11 is a schematic diagram showing the shape of the cover 24 of Example 2 of the disclosure, which is applied to the vehicle of FIG. 1. The first flat surface 44a of the cover 24 of Example 2 is further provided with an inclination that increases toward the central portion from both ends in the longitudinal direction of the first flat surface 44a, that is, in the width direction of the lower end plate 22, in addition to the above-described inclination that is directed downward as the first flat surface 44a is directed toward the engine 10 side. According to Example 2, as shown by a one-dot chain line in FIG. 11, in a case where traveling wind that is directed toward the middle side from both the outer sides enters between the engine block 10a and the end plate 18, foreign matter is further restrained from staying on the first flat surface 44a by the traveling wind.

Example 3

Figure 12:
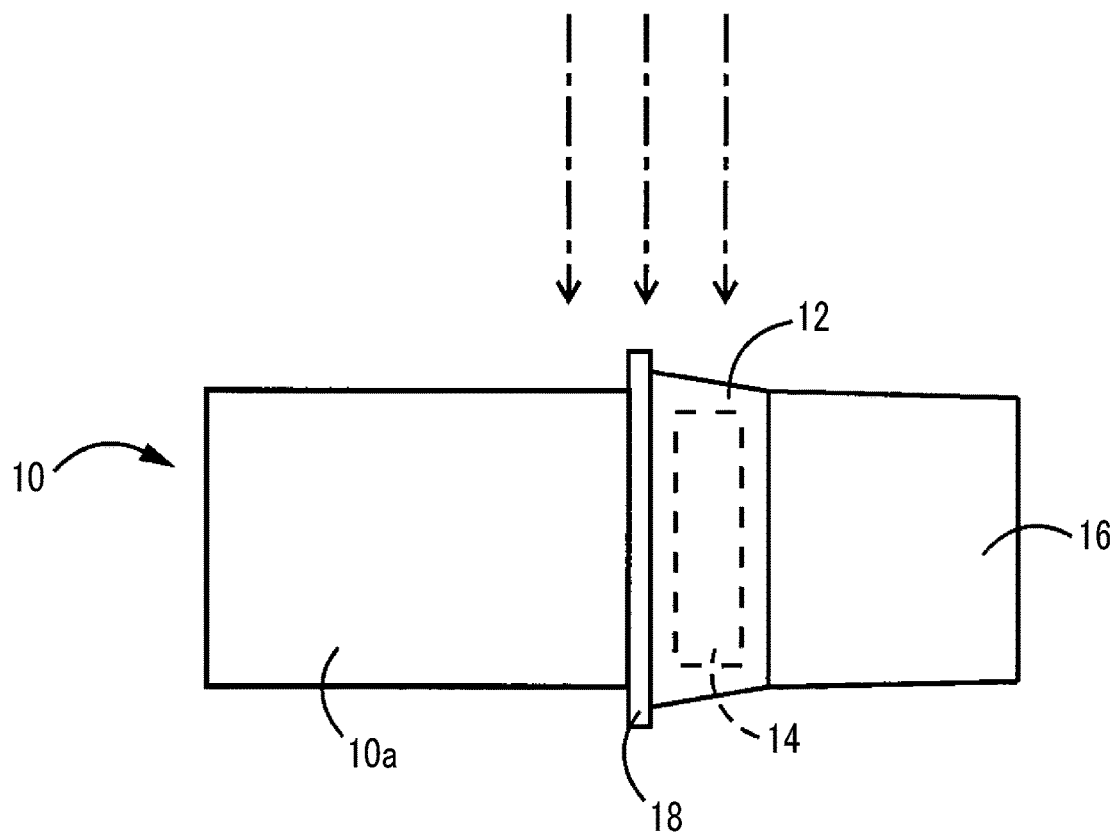
FIG. 12 is a schematic diagram showing an FF vehicle to which a cover of an end plate for a vehicle of Example 3 of the disclosure is applied.

FIG. 12 is a schematic diagram showing a vehicle, that is, an FF vehicle, to which the cover 24 of an end plate for a vehicle of Example 3 of the disclosure is applied. In Example 3, as shown by a one-dot chain line, traveling wind that is directed toward the middle side from the outside on one side, which is the front of the vehicle, enters between the engine block 10a and the end plate 18.

Figure 13:
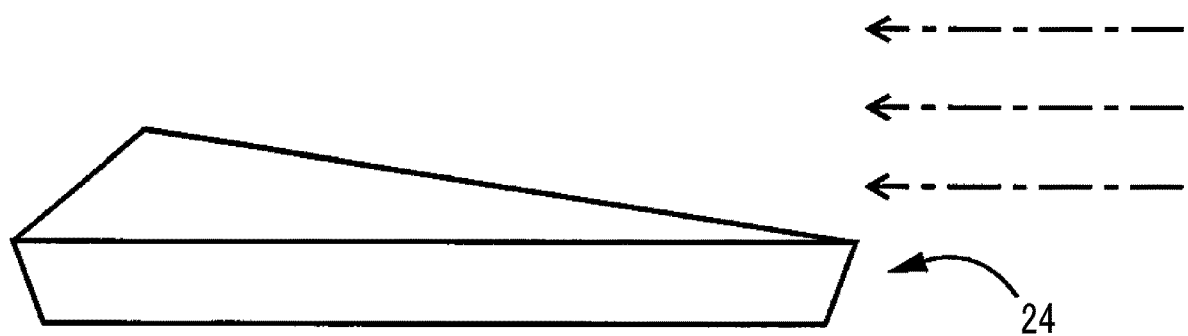
FIG. 13 is a schematic diagram showing the shape of the cover of Example 3 of the disclosure that is applied to the vehicle of FIG. 12.

FIG. 13 is a schematic diagram showing the shape of the cover 24 of Example 3, which is applied to the vehicle of FIG. 12. The first flat surface 44a of the cover 24 of Example 3 is further provided with an inclination that increases toward the other end from one end on the windward side and steeply decreases toward the other end portion in the longitudinal direction of the first flat surface 44a, that is, in the width direction of the lower end plate 22, in addition to the above-described inclination that is directed downward as the first flat surface 44a is directed toward the engine 10 side. According to Example 3, as shown by a one-dot chain line in FIG. 13, in a case where traveling wind that is directed toward the other end from one end enters between the engine block 10a and the end plate 18, foreign matter is further restrained from staying on the first flat surface 44a by the traveling wind.

Example 4

Figure 14:
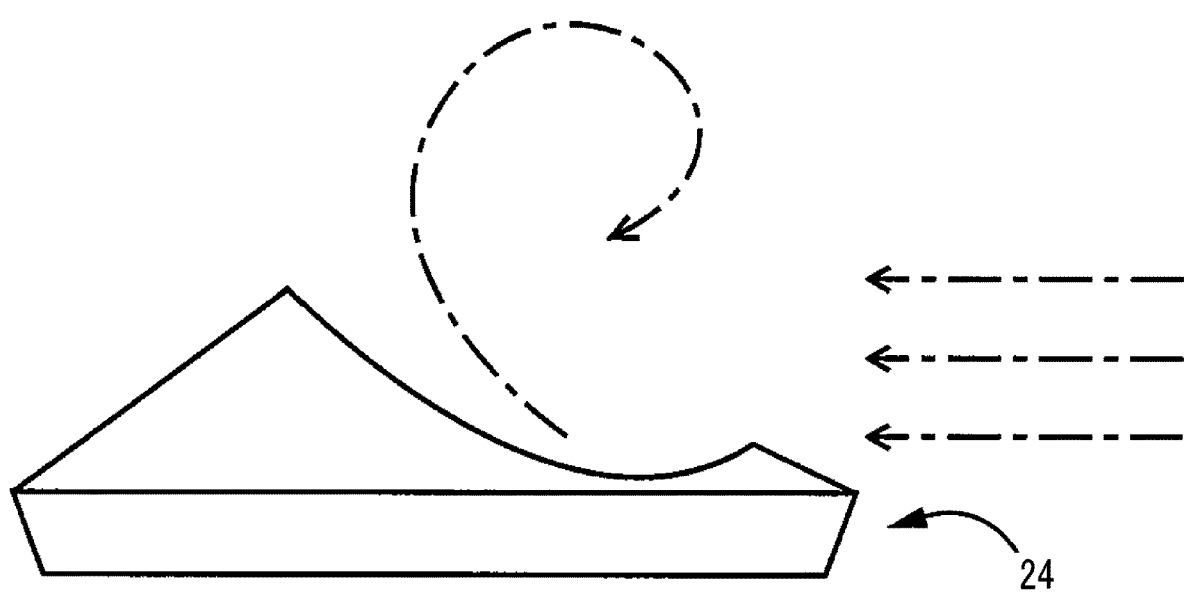
FIG. 14 is a schematic diagram showing the shape of a cover of Example 4 of the disclosure that is applied to the vehicle of FIG. 12.

FIG. 14 is a schematic diagram showing the shape of the cover 24 of Example 4, which is applied to the vehicle shown in FIG. 12. In the cover 24 of Example 4, in a case where traveling wind changes direction due to a vehicle-mounted component, as shown by a one-dot chain line in FIG. 14, in order to make it more difficult for foreign matter to stay on the first flat surface 44a due to the cyclone effect, the first flat surface 44a is further provided with an inclination that becomes steeper toward the other end from one end on the windward side and steeply decreases at the other end portion in the longitudinal direction of the first flat surface 44a, that is, in the width direction of the lower end plate 22, in addition to the above-described inclination that is directed downward as the first flat surface 44a is directed toward the engine 10 side.

The examples of the disclosure have been described in detail above based on the drawings. However, the disclosure is also applicable in other aspects.

For example, the cover 24 in the examples described above has an elongated shape according to the shape of the elongated gap 36. However, the shape of the gap 36 and the shape of the cover 24 for covering the gap 36 may be variously changed. In short, a configuration may be made in which the first stepped portion 44c that is configured of the first flat surface 44a and the second flat surface 44b intersecting with the first flat surface 44a is formed on the engine 10 side of the cover 24 and the inclination angle θ1 that is directed downward with respect to a horizontal plane as the first flat surface 44a is directed toward the engine 10 side is formed on the first flat surface 44a.

In the cover 24 in the examples described above, the first stepped portion 44c having the first flat surface 44a and the second stepped portion 44f having the third flat surface 44d are formed on the engine 10 side of the cover 24. However, a configuration may be adopted in which the second stepped portion 44f is not formed and solely the first stepped portion 44c having the first flat surface 44a is formed.

The above is merely one embodiment, and the disclosure can be implemented in aspects with various modifications or improvements added thereto based on the knowledge of those skilled in the art.

What is claimed is:

1. An end plate for a vehicle including an engine and a housing, the engine being fastened to the housing through the end plate, the end plate comprising:

an upper end plate;

a lower end plate; and a cover that covers a gap between a lower end edge of the upper end plate and an upper end edge of the lower end plate, the cover including:

a first stepped portion provided on an engine side of the cover, the first stepped portion including a first flat surface and a second flat surface intersecting with the first flat surface, and the first flat surface is inclined downward with respect to a horizontal plane as the first flat surface is directed toward the engine side, an upper end gripping portion configured to grip the upper end edge of the lower end plate, a lower end contact portion in contact with a surface on a housing side of the lower end edge of the upper end plate, and a connecting portion connecting the upper end gripping portion and the lower end contact portion, the first stepped portion being provided on the engine side of the connecting portion.

2. The end plate according to claim 1, wherein:

the cover is made of elastically deformable synthetic rubber; and the cover integrally includes the upper end gripping portion, the lower end contact portion, and the connecting portion.

3. The end plate according to claim 1, wherein:

the upper end edge of the lower end plate is linear;

a central portion in a lateral width direction of the lower end edge of the upper end plate has a protruding portion that protrudes toward the housing side with respect to the upper end edge of the lower end plate;

the gap is located in an elongated shape between the upper end edge of the lower end plate and the protruding portion, the protruding portion being located on the housing side above the upper end edge of the lower end plate; and the cover has an elongated shape so as to close the gap.

4. The end plate according to claim 3, wherein:

the cover includes a second stepped portion, the second stepped portion is located between the upper end edge of the lower end plate and the protruding portion;

the second stepped portion is provided further on the engine side than the first stepped portion;

the second stepped portion has a third flat surface and a fourth flat surface intersecting with the third flat surface; and the third flat surface has an inclination that is directed downward with respect to the horizontal plane as the third flat surface is directed toward the engine side.

5. The end plate according to claim 1, wherein:

the upper end gripping portion has a linear groove into which the upper end edge of the lower end plate is fitted; and the lower end contact portion has a cover wall that protrudes upward from the first flat surface and is in contact with the lower end edge of the upper end plate to cover the lower end edge.

6. The end plate according to claim 5, wherein:

the cover includes a front wall on the engine side of the cover, the front wall has a plurality of cutouts at a plurality of locations in a longitudinal direction of the front wall, the front wall defining the groove;

a plurality of engaging projections is located in the plurality of cutouts on a side wall surface on the housing side out of a pair of side wall surfaces facing each other in the groove;

a height of the engaging projections is larger than a width dimension of the groove, and a plurality of engaging recesses with which the engaging projections are engaged is provided at the upper end edge of the lower end plate.

* * * * *